United States Patent
Kuipers et al.

(10) Patent No.: US 7,937,938 B2
(45) Date of Patent: May 10, 2011

(54) HYDRAULIC REVERSING FAN VALVE AND MACHINE USING SAME

(75) Inventors: Beau Kuipers, Minooka, IL (US); Edward Mate, Manhatten, IL (US); Glenn Stanfield, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 454 days.

(21) Appl. No.: 12/148,808

(22) Filed: Apr. 23, 2008

(65) Prior Publication Data
US 2009/0266072 A1      Oct. 29, 2009

(51) Int. Cl.
*F16D 31/02* (2006.01)

(52) U.S. Cl. .................... 60/456; 60/468; 60/493

(58) Field of Classification Search .......... 60/456, 60/468, 493, 494
See application file for complete search history.

(56) References Cited

U.S. PATENT DOCUMENTS

| | | |
|---|---|---|
| 4,370,950 A | 2/1983 | Furukubo |
| 6,076,488 A | 6/2000 | Yamagishi |
| 6,463,893 B1 | 10/2002 | Foster et al. |
| 6,532,738 B2 * | 3/2003 | Sharkness et al. ............ 60/468 |
| 6,659,050 B1 | 12/2003 | Creech et al. |
| 6,681,568 B2 | 1/2004 | Smith |
| 6,959,671 B2 | 11/2005 | Nakagawa et al. |
| 7,240,486 B2 | 7/2007 | Huang et al. |

FOREIGN PATENT DOCUMENTS

WO      03054365      7/2003

* cited by examiner

*Primary Examiner* — Michael Leslie
(74) *Attorney, Agent, or Firm* — Liell & McNeil

(57) ABSTRACT

A machine includes a hydraulic fan system for circulating cooling air through an engine compartment. Periodically, the fan rotation direction is briefly reversed in order to dislodge any material debris that may have accumulated at the inlet to the engine compartment. When a fan reversal event is initiated, the fan motor will continue to rotate due to angular momentum even after the pump output flow has been switched from a first motor port to a second motor port. During this continued rotation as the fan decelerates to zero speed, vacuum pressure levels can arise at the first motor port, and a pressure spike can develop at the second motor port. In order to alleviate these conditions, a pressure transfer valve briefly opens to facilitate fluid flow directly from the second motor port to the first motor port as the fan motor decelerates towards zero speed before reversing direction, simultaneously alleviating vacuum and pressure spike conditions.

20 Claims, 3 Drawing Sheets

HYDRAULIC REVERSING FAN VALVE AND MACHINE USING SAME

TECHNICAL FIELD

The present disclosure relates generally to hydraulic cooling fan systems for machines, and more particularly to a fan reversal valving strategy that reduces cavitation and pressure spikes.

BACKGROUND

Many machines over many decades have included cooling fans for circulating air over a component, such as an engine, to be cooled during normal operation of the machine. The cooling fan and engine may be housed in a common engine compartment that includes openings to define an air flow passage through the compartment. Typically, these openings are covered with some screening material or other strategy for preventing debris from entering the engine compartment. In some machines, such as off road construction machines, landfill machines and the like, debris can collect on these screens during machine operation, resulting in a decrease in cooling air through the various coolers located in the engine compartment and a degradation of the cooling of the machine. Coolers include, but are not limited to hydraulic oil, transmission oil, intake air, etc. The cooling air may also circulate over the engine. Over the years, a variety of strategies have been developed to deal with this phenomenon. One known strategy is to periodically and briefly reverse the cooling air flow direction to dislodge any debris that may have collected on the screen surface. This may be accomplished either by reversing a cooling fan's rotation direction or even altering cooling fan blade orientations.

In one specific example taught in co-owned U.S. Pat. No. 7,240,486, an electro-hydraulic fan system includes a hydraulic motor for rotating the fan to circulate cooling air about an engine. In order to periodically dislodge debris that may have collected on a screen covering the air flow passage entry into the engine compartment, an electrical actuator is energized to move a valve to change the flow direction of hydraulic fluid being supplied to the fan motor. Although the fan motor is typically decelerated before the fluid flow reversal event takes place, the fan motor may continue to have rotational momentum in one direction even after the flow reversing direction valve actuator is energized. When this occurs, the residual angular momentum in the motor causes it to briefly act as a pump resulting in a pressure surge or spike at one port and a severe pressure drop or vacuum at its other port until the motor reaches zero speed before reversing direction. The '486 patent utilizes auxiliary check valves to open a fluid connection between the low pressure tank and the port undergoing a vacuum during the fan reversal process. As such, vacuum conditions can be somewhat alleviated as fluid from the tank can flow to the low pressure port. However, this does little to alleviate, and may actually exacerbate the pressure spike at the other port. Since the fan reversal motor, and the associated valves and pump can be expected to experience the consequences of a multitude of fan reversal events, problems and premature degradation in these components can be revealed due to the repeated cavitation/pressure spike events that typically accompany a fan reversal process.

The present disclosure is directed toward one or more of the problems set forth above and to reducing cavitation and/or pressure spikes in reversing hydraulic motor systems.

SUMMARY OF THE DISCLOSURE

In one aspect, a valve assembly for a hydraulically driven motor includes a manifold with a first motor port, a second motor port, at least one tank port, a pump port and a line sensing port. A load control valve, which includes a first electrical actuator, is attached to the manifold. A flow direction control valve, which includes a second electrical actuator, is also attached to the manifold. A pressure transfer valve is attached to the manifold and has a first configuration at which the first motor port is fluidly blocked from the second motor port, and a second configuration at which the first motor port is fluidly connected to the second motor port.

In another aspect, a machine includes a hydraulic fan system with a tank, a pump, a fan rotatably coupled to a hydraulic motor, a pressure transfer passage extending between a first motor passage and a second motor passage. The hydraulic fan system also includes a pressure transfer valve positioned in the pressure transfer passage, with a first configuration at which the first motor passage is fluidly blocked from the second motor passage, and a second configuration at which the first motor passage is fluidly connected to the second motor passage. The hydraulic motor rotates in a first direction responsive to fluid flow from the first motor passage, through the hydraulic motor to the second motor passage. The hydraulic motor rotates in a second direction responsive to fluid flow from the second motor passage, through the hydraulic motor to the first motor passage. The hydraulic fan system also includes a flow direction control valve having a first configuration at which the first motor passage is fluidly connected to an outlet of the pump, and a second configuration at which the second motor passage is fluidly connected to the outlet of the pump.

In still another aspect, a method of reversing a fan rotation direction includes switching a pump output fluid connection from a first motor passage to a second motor passage. Fluid flow in a pressure transfer passage is channeled from the second motor passage to the first motor passage while the fan is decelerating toward a zero speed. The pressure transfer passage is then closed. Finally, the fan is rotated in a reverse direction by channeling fluid flow from the pump output, into the second motor passage, through a motor coupled to the fan, and then to the first motor passage after closing the pressure transfer passage.

DETAILED DESCRIPTION

Figure 1:
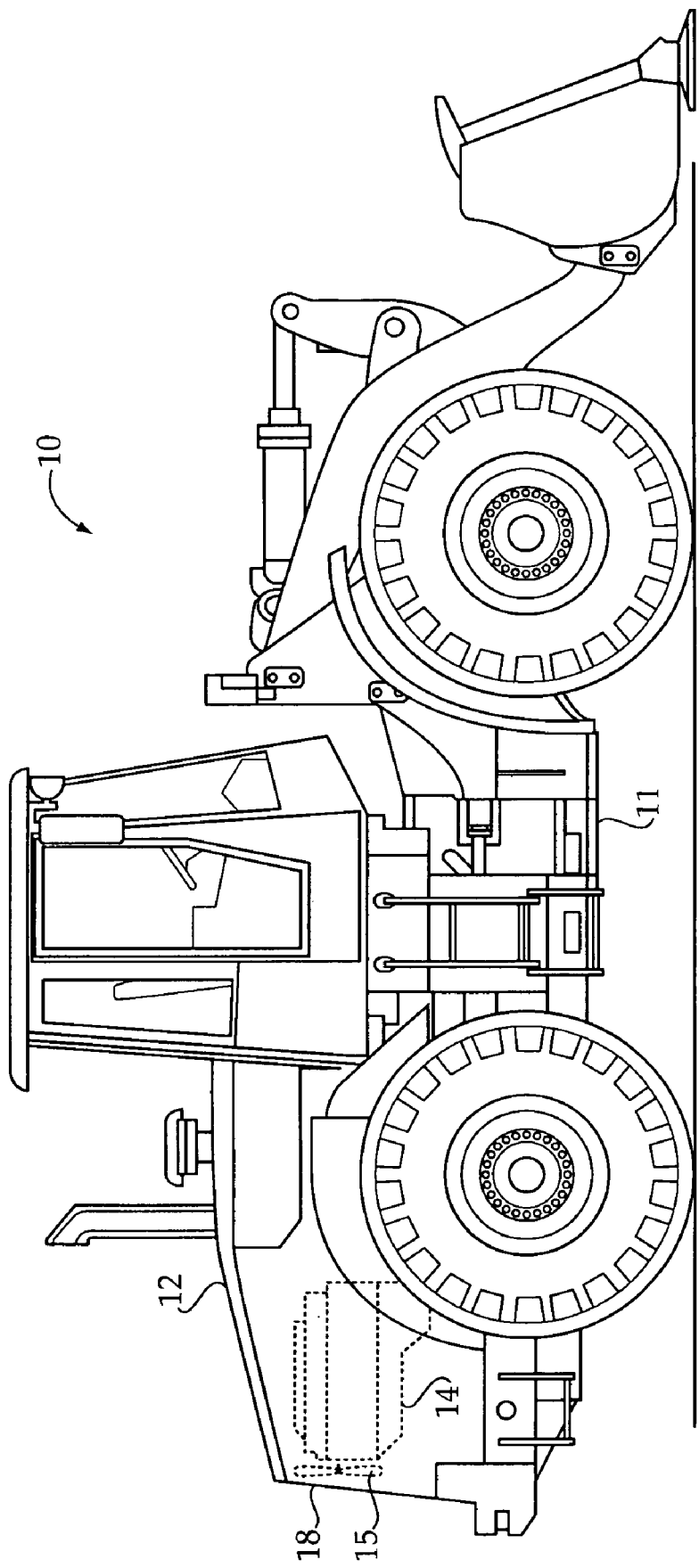
FIG. 1 is a side elevational view of a machine according to one aspect of the disclosure.

Referring to FIG. 1, a machine 10 includes a chassis 11 with an engine housing 12. An engine 14 along with an associated cooling fan 15 may be mounted in engine housing 12 in a conventional manner. Engine housing 12 includes an opening 18, which may be screened, through which cooling fan 15 draws ambient air and circulates the same over engine 14. Although not shown, cooling fan 15 may also circulate air through one or more heat exchangers, such as a radiator, an oil cooler, etc. Although machine 10 is illustrated as an articulated wheel loader, the concepts of the present disclosure are equally applicable to wide variety of machines that include engines and cooling fans. Although the present disclosure is illustrated with regard to a mobile machine, the present disclosure also finds potential application to stationary systems, such as generator sets and the like. In addition, although the present disclosure is illustrated in the context of a cooling fan for a variety of coolers (e.g., hydraulic oil, transmission oil, intake air, radiator, etc.) associated with an engine and other machine systems, the present disclosure could find potential application to other cooling fan applications where a hydraulically motored fan is used to circulate air past some machine component and/or heat exchanger needing cooling air.

Figure 2:
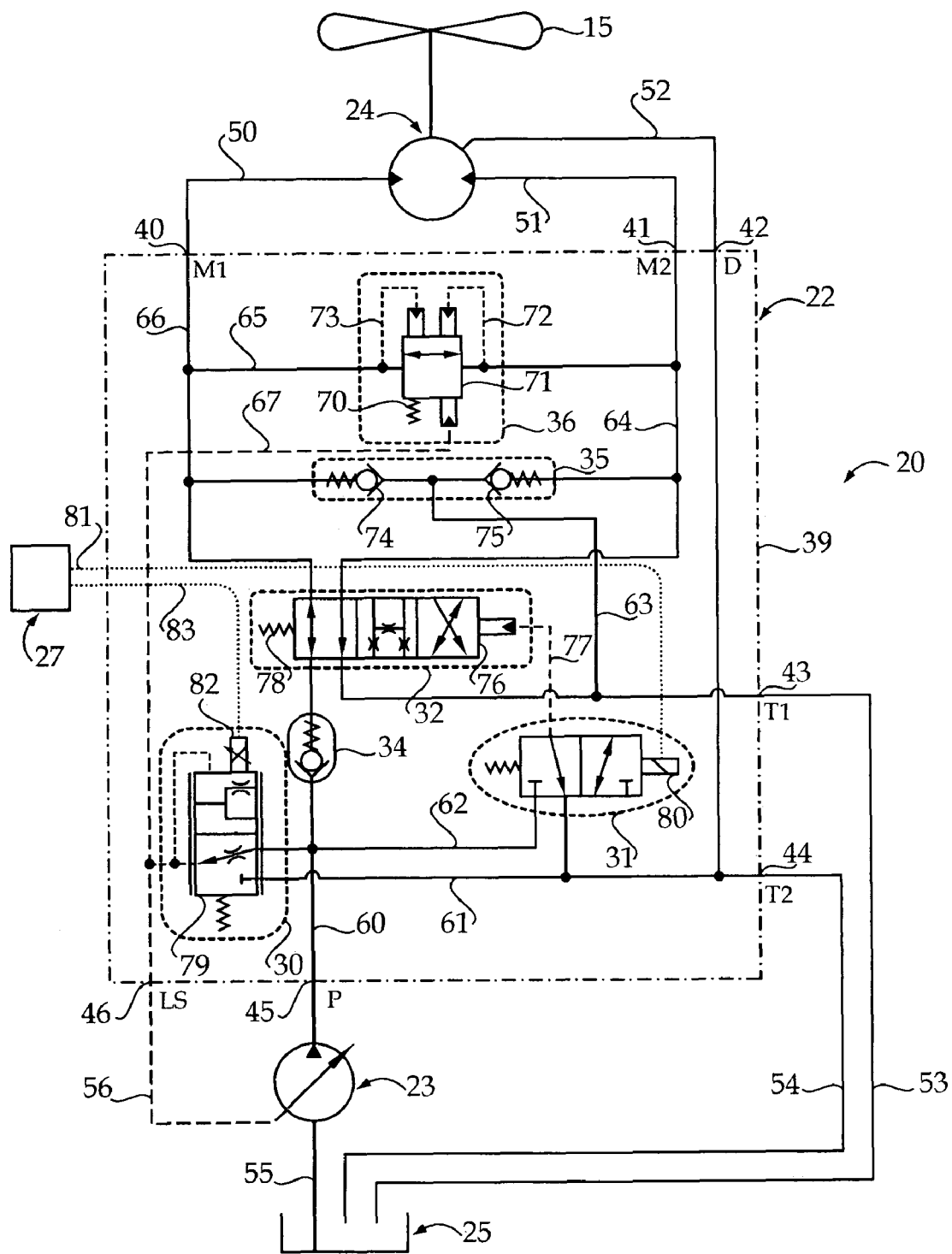
FIG. 2 is a schematic view of a fan hydraulic system according to another aspect of the present disclosure.

Referring now to FIG. 2, a hydraulic fan system 20 for the machine 10 of FIG. 1 is illustrated. Hydraulic fan system 20 includes a valve assembly 22, a hydraulic motor 24 for driving the rotation of fan 15, an electronic controller 27, a pump 23 and a hydraulic fluid tank 25. Pump 23 is supplied with low pressure hydraulic fluid from tank 25 via pump supply passage 55. Valve assembly 22 includes a manifold 39 that defines a variety of fluid passageways and houses the valves associated with the hydraulic fan system 20 of the present disclosure. Although not necessary, the various valves housed in manifold 39 are illustrated as cartridge valves that may be attached to manifold 39 in a conventional manner such as via a threaded attachment, the present disclosure is not so limited. For example, one or more of the valves could have separate housings connected by appropriate conduits. However, the use of a manifold 39 allows for various non-valving components to be connected to ports of the manifold, and the various fluid connections among these components facilitated via the valves and passageways of manifold 39. The use of a cartridge valving strategy may better facilitate servicing in the event of a need arising to replace one or more of the valve cartridges. In addition, the use of manifold 39 also facilitates the possibility of the hydraulic fan system 20 of the present disclosure being easily retro-fitted into previous systems that include similar external components, i.e., a fan motor, a pump, a tank, etc., but without the advantageous valving system of the present disclosure.

Manifold 39 houses a load control valve cartridge 30 that includes a fan load control electrical actuator 82 in control communication with electronic controller 27 via a communication line 83. Via an appropriate load control signal to electrical actuator 82, a valve member 79 can be variably positioned to control an LS pressure in a line sensing passage 67, which is utilized via line sensing port 46 and external line sensing passage 56 to control the output of pump 23 in a known manner. The output from pump 23 is delivered to manifold 39 at pump port 45 into pump output passage 60 to control the supply rate of fluid to hydraulic motor 24. The positioning of load control valve member 79 is determined by a sum of the forces caused by biasing spring, the pressure in line sensing passage 67 acting on one end of valve member 79, and the magnitude of the control signal supplied to electrical actuator 82. Thus, the control signal supplied to electrical actuator 82 controls the load applied to hydraulic motor 24 to control the rate at which fan 15 displaces air in a conventional manner.

Fluid from pump 23 passes along pump output passage 60 and through a pump protection valve cartridge 34 on its way to flow direction valve cartridge 32. Pump protection valve 34 may take the form of a check valve that prevents any pressure spikes that develop due to fan reversal events from making their way back to pump 23. However, pump protection valve 34 may be omitted without escaping the intended scope of the present disclosure.

In the illustrated configuration, flow direction valve 32 is positioned such that output from pump 23 is channeled to first motor passage 66, out of first motor port 40, into external first motor passage 50 and then through motor 24 to rotate the fan 15 in one direction. Flow direction valve 32 may also be configured to channel output from pump 23 into second motor passage 64 out of second motor port 41, into external second motor passage 51 and then to motor 24 to rotate the fan 15 in a reverse direction. Regardless of which direction fan 15 is driven to rotate, the hydraulic fluid is returned to tank after passing through motor 24. For instance, when hydraulic fluid is supplied to motor 24 from first motor port 40, the hydraulic fluid returns to tank via external second motor passage 51, second motor port 41, to flow direction valve cartridge 32 via second motor passage 64 and eventually to first tank port 43. From that point, the fluid is returned to tank 25 via first tank line 53. On the otherhand, if fluid is being delivered to motor 24 from second motor port 41 to rotate fan 15 in an opposite direction, the return fluid makes its way back to first tank port 43 via external first motor passage 50, first motor port 40, first motor passage 66 and then through flow direction valve 32 and eventually to first tank port 43.

Flow direction valve 32 is configured by a hydraulic pressure acting on pressure actuation surface 76 acting in opposition to a biasing spring 78. The pressure acting on pressure actuation surface 76 is determined by the positioning of pressure switch valve 31, which also may be a cartridge attached to manifold 39. Pressure switch valve 31 includes a rotation direction control electrical actuator 80 that is in control communication with electronic controller 27 via a communication line 81. Thus, when electrical actuator 80 is unenergized, pressure switch valve 31 is configured as shown due to biasing spring. In this configuration, pressure on pressure actuation surface 76 of flow direction valve 32 is low via the fluid connection of control pressure passage 77 to vent passage 61, which is connected to the second tank port 44 and then onto tank 25 via second tank line 54. When electrical actuator 80 is energized, the pressure switch valve 31 is reconfigured against the action of its biasing spring to fluidly connect pressure actuation surface 76 to high pressure via pressure communication passage 62 that is fluidly connected to pump output passage 60. Although not shown, pressure communication passage 62 may include a pressure reduction strategy, such as a pressure reduction valve (not shown) in order to perform the control function with a lower pressure or possibly a uniform pressure regardless of the output of pump 23.

Valve assembly 20 also includes a tank connection valve cartridge 35 that includes a first check valve 74 and a second check valve 75. Like the other valves, tank connection valve 35 may be housed in a cartridge that is attached to manifold 39. Check valves 74 and 75 may be needed when the machine is shut down and flow is removed completely in order to maintain fluid in the system. However, those skilled in the art will appreciate that other possible configurations and/or the function of these valves may be merged in a different strategy without departing from the intended scope of the present disclosure. For instance, an alternative might be to include a single check valve on an opposite side from direction control valve 32 between first tank port 43 and pump output passage 60, on the downstream side of valve 34 without departing from the present disclosure. When pressure in one of the first motor passage 66 or second motor passage 64 drops to vacuum levels, the associated check valve 74 or 75 can briefly open to allow fluid to be drawn from tank 25 via low pressure passage 63 to alleviate the vacuum condition.

In order to lubricate and vent the casing for motor 24, a lube passage 52 may be connected to motor lube port 42 which communicates with second tank port 44. These passages allow for lubrication of the motor 24 while also preventing a build up of pressure within motor 24 via the vent to tank 25.

Much of the novelty related to the present disclosure relates to a pressure transfer valve 36, which also may be a cartridge attached to manifold 39. Pressure transfer valve 36 is positioned in a pressure transfer passage 65 that is fluidly connected at one end to first motor passage 66 and at its other end to second motor passage 64. Thus, pressure transfer passage 65 represents a short circuit for fluidly connecting first motor port 40 to second motor port 41, and vice versa. In the illustrated embodiment, pressure transfer valve 36 includes a valve member 71 that is mechanically biased toward the closed position shown via a biasing spring 70 with a predetermined pre-load. In addition, valve member 71 may be pressure biased in the same direction as that caused by biasing spring 70 due to fluid pressure acting on one end of valve member 71 from pressure in line sensing passage 67. In opposition to these forces, fluid pressure from first motor passage 66 is communicated to the opposite end of valve member 71 via pressure communication passage 73, and pressure in second motor passage 64 is likewise communicated to that opposite end of valve member 71 via pressure communication passage 72. Valve member 71 may move toward a configuration that opens pressure transfer passage 65 when pressure in one of pressure communication passage 72 or 73 or some combination of 72 and 73, respectively, is at least a predetermined pressure differential greater than the pressure acting on the opposite end of valve member 71 via the pressure in line sensing passage 67. In the illustrated embodiment, this pressure differential may be set to be at least 30 bar by setting a desired preload on spring 70. Thus, valve member 71 may move to open pressure transfer passage 65 when the pressure in pressure communication passage 72 or 73, or some combination of 72 and 73 creates a pressure force that is greater than the opposition pressure force from pressure in line sensing passage 67 plus the spring force from spring 70.

In the illustrated embodiment, pressure transfer valve 36 may be a multi position valve in which the flow area through pressure transfer passage 65 is proportional to the pressure differential across valve member 71. In other words, a greater pressure differential may produce a larger flow area and permit a larger and faster flow volume rate from one of first motor passage 66 and second motor passage 64 to the other of the first and second motor passages. During most of the operation of hydraulic fan system 20, pressure transfer valve 36 will remain closed. In other words the preload on spring 70 should be sufficiently high that pressure transfer valve 36 moves to an open position during fan reversal events, or other event where pressure relief is desired, in order to simultaneously channel excess fluid pressure spikes at one of the motor ports to relieve a vacuum at the other of the motor ports.

INDUSTRIAL APPLICABILITY

The present disclosure relates generally to any hydraulically driven fan system with a need to occasionally reverse fan rotation directions by changing a fluid flow direction to a hydraulic motor that rotates the fan. The present disclosure finds particular applicability to hydraulically driven fans used to cool a component of a machine, such as an engine. In particular, some off road machines (e.g., wheel loaders, track type tractors, landfill equipment, etc.) may encounter an accumulation of debris at the engine compartment air opening, and the fan is periodically and briefly reversed in the direction to dislodge the debris in order to maintain the flow rate of cooling air through the engine compartment.

Figure 3A:
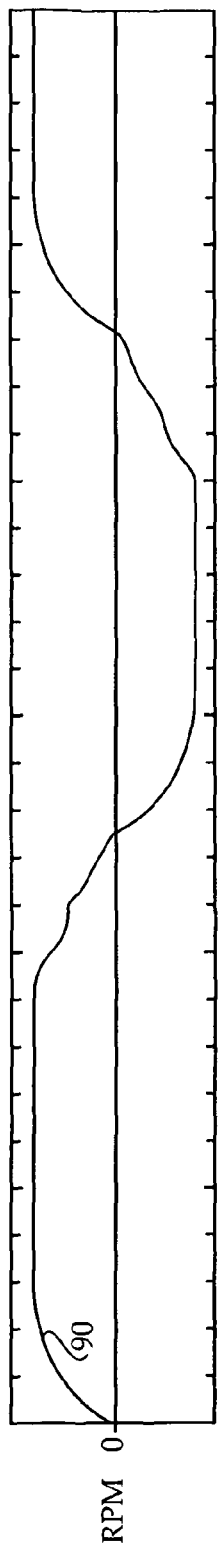
FIG. 3a is a graph of fan speed verses time showing two fan reversal events.
Figure 3B:
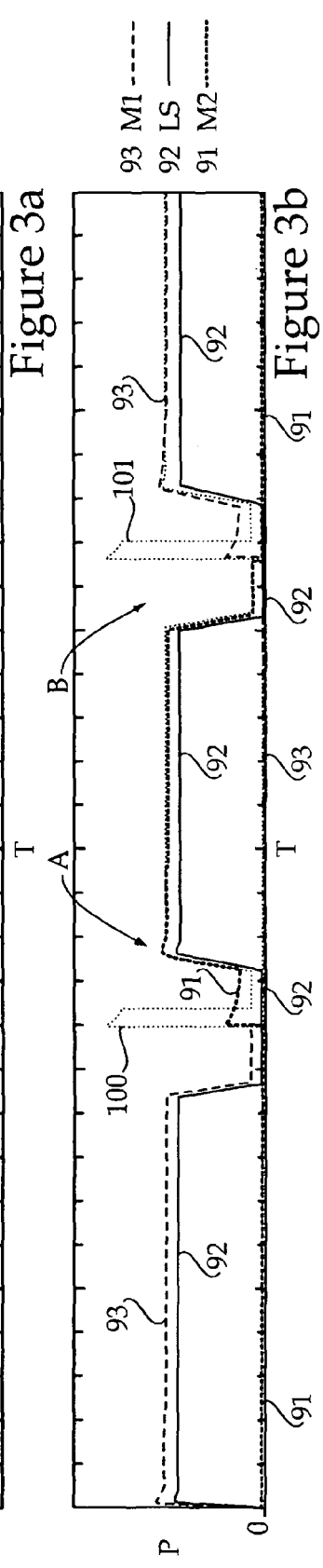
FIG. 3b is a graph of first motor port pressure, second motor port pressure and line sensing pressure verses time.
Figure 3C:
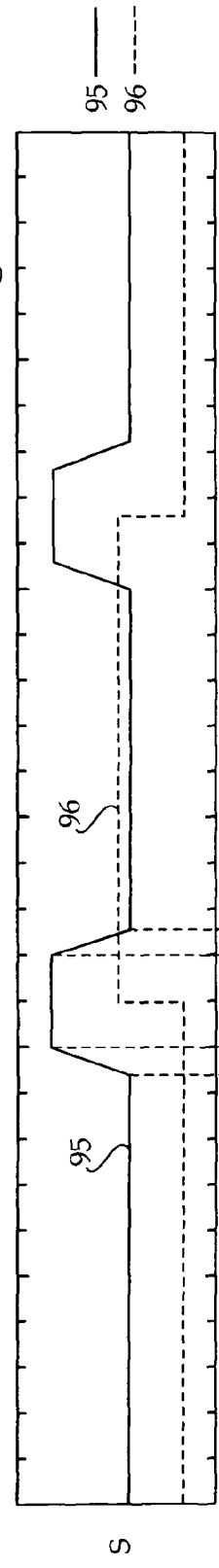
FIG. 3c is a graph of fan load control signal and fan direction control signal verses time.

Referring now in addition to FIGS. 3a-d, various features of the hydraulic fan system 20 of the present disclosure are graphed against time for a first fan reversal event A and a second fan reversal event B. In other words, prior to first fan reversal event A, the hydraulic fan system 20 is configured as shown in FIG. 2 with cooling fan 15 rotating at a speed 90 in a direction that draws ambient air through air flow passage 18 into engine compartment 12 for cooling of engine 14. At a predetermined time as programmed into electronic controller 27, a fan reversal event A will be initiated to dislodge any debris that may have accumulated at air passage opening 18. This process is started at time $t_1$ by changing the control signal 95 (FIG. 3c) to fan load control electrical actuator 82 to reduce fan speed 90 as shown in FIG. 3a. At time $t_2$, the control signal 95 to electrical actuator 82 may be held constant and the fan speed 90 continues to reduce before energizing rotation direction control electrical actuator 80 with a control signal 96 at time $t_3$. When electrical actuator 80 is energized, pressure switch valve 81 moves to a position that increases pressure on pressure actuation surface 76 of flow direction valve 32 to move it against the action of its biasing spring 78. When this occurs, the output from pump 23 is redirected from first motor passage 66 into second motor passage 64. At this same time, the return to tank path is reversed from second motor passage 64 to first motor passage 66. As can be seen from the graph of FIG. 3a, the fan speed 90 may be slowing but it still continues to rotate due to angular momentum. As such, motor 24 briefly may effectively turn into a pump in which its output is directed into external motor passage 51 and then into second motor passage 64 via second motor port 41. Thus with pump 23 trying to push its output into second motor passage 64 and motor 24 acting as a pump directing fluid into the same passage, a pressure spike 100 associated with the prior art might occur in second motor passage 64 if hydraulic fan system 20 were not equipped with a pressure transfer valve 36 according to the present disclosure.

Figure 3D:
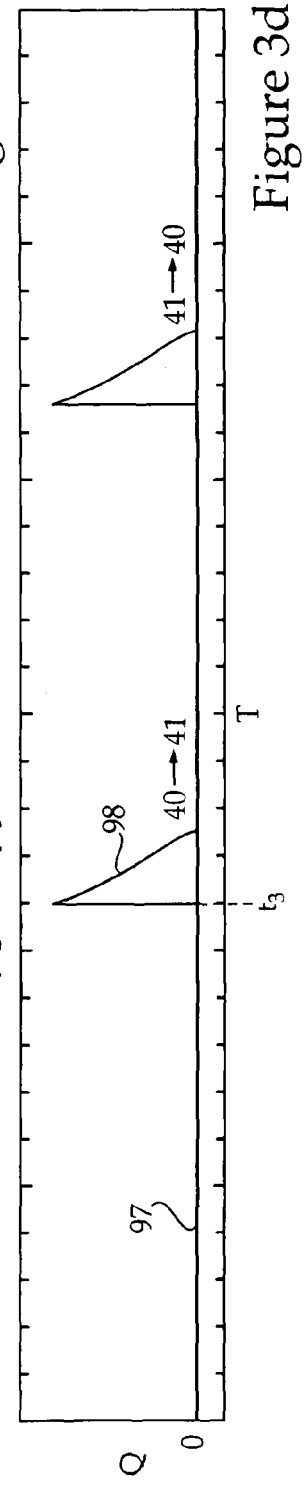
FIG. 3d is a graph of fluid flow rate in the pressure transfer passage versus time.

The initial slowing of fan speed 90 is accomplished at $t_1$ via load control valve 30 that reduces pressure 92 in line sensing passage 67. At the same time, the pressure 93 in first motor passage 66 also decreases as pump output decreases, which is also reflected in a reduction of fan speed 90. The pressure 91 initially rises after energization of electrical actuator 80 until the pressure differential between pressure communication passage 72 and pressure 92 in line sensing passage 67 is sufficient to overcome spring 70 and cause valve member 71 of pressure transfer valve 36 to move to an open position. When this occurs, the prior art pressure spike 100 is avoided, and instead as shown in FIG. 3d, a surge of fluid flow occurs in pressure transfer passage from second motor port 64 into first motor port 66 via pressure transfer passage 65. Also during this time, the fan speed 90 slows to a stop and then starts turning in an opposite direction. Thus, the pressure surge in second motor port 64 is alleviated simultaneously with alleviating a vacuum that may have formed in first motor passage 66 due to the continued rotation of motor 24 making motor 24 act as a pump with first motor passage 66 being its inlet. Check valve 74 may also open to supply fluid from tank to alleviate vacuum conditions and to avoid cavitation.

At time 4, the fan load control signal 95 is changed again to increase fan speed 90 in the reverse direction until at time $t_5$ where the fan load control signal 95 is commanded to a desired state or speed for the duration of the time period when fan 15 is rotated in an opposite direction to dislodge material at air passage opening 18 of machine 10. At the end of this duration, a second fan reversal event B is undertaken in a similar manner to reverse the fan back to its regular cooling rotation direction. A prior art pressure spike 101, which might occur in first motor passage 66 without pressure transfer valve 36, is avoided by channeling that fluid pressure back to second motor port 64 via pressure transfer valve 36 in order to simultaneously relieve pressure spike condition in first motor passage 66 and a vacuum condition that might develop in second motor passage 64 due to the continued angular momentum in motor 24 as it slows in speed before reversing direction. FIG. 3d shows that this is accomplished via a brief surge in flow back through pressure transfer passage 65 through pressure transfer valve 36 during the second fan reversal event B.

Those skilled in the art will appreciate that the primary purpose of the pressure transfer valve 36 is to short circuit a connection between motor ports 40 and 41 when fan 24 continues rotating due to angular momentum on its way to reversing direction. Thus, those skilled in the art will appreciate that other combinations of one or more valves could be installed as an alternative, but accomplish the same purpose, as the illustrated pressure transfer valve 36. For instance, one alternative might channel pump output pressure to pressure transfer valve 36 instead of the pressure in line sensing passage 67. Other valving strategies that may operate directly based upon the pressure differential between motor port 40 and motor port 41 may also be an alternative to the illustrated structure of pressure transfer valve 36. For instance a biased toward a center closed position spool valve might be moved left or right based upon a pressure differential between motor port 40 and motor port 41 exceeding some predetermined magnitude that would only occur during a fan reversal event. Thus, those skilled in the art will appreciate that other valving structures could be substituted in place of the illustrated embodiment without departing from the scope of the present disclosure.

Those skilled in the art have long known that pressure surges or pressure spikes as well as pressure vacuums and the associated cavitation can degrade or damage a hydraulic system. The present disclosure advantageously and simultaneously alleviates a pressure spike and pressure vacuum condition by providing a short circuit fluid connection between the potential pressure spike location and the vacuum location at the precise time at which those events would coincide for a fan reversal event in a hydraulic fan system 20.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A valve assembly for a hydraulically driven motor, comprising:
    a manifold that includes a first motor port, a second motor port, at least one tank port, a pump port, and a line sensing port;
    a load control valve, which includes a first electrical actuator, attached to the manifold;
    a flow direction control valve, which includes a second electrical actuator, attached to the manifold;
    a pressure transfer valve attached to the manifold, and having a first configuration at which the first motor port is fluidly blocked from the second motor port, and a second configuration at which the first motor port is fluidly connected to the second motor port; and
    wherein the pressure transfer valve moves from the first configuration toward the second configuration when a pressure differential between the line sensing port and one of the first and second motor ports exceeds a predetermined pressure differential.

2. The valve assembly of claim 1 wherein the load control valve is housed in a first cartridge attached to the manifold;
    the flow direction control valve includes a pressure switch valve and the second electrical actuator housed in a second cartridge attached to the manifold, and a pressure actuated flow direction valve housed in a third cartridge attached to the manifold; and
    the pressure transfer valve is housed in a fourth cartridge attached to the manifold.

3. The valve assembly of claim 2 including a pump protection valve housed in a fifth cartridge attached to the manifold;
    a tank connection valve having a first configuration at which the tank port is fluidly connected to the first motor port, a second configuration at which the tank port is fluidly connected to the second motor port, and a third configuration at which the tank port is fluidly blocked to both the first motor port and the second motor port; and
    the tank connection valve includes a first check valve and a second check valve housed in a sixth cartridge attached to the manifold.

4. The valve assembly of claim 3 wherein the at least one tank port includes a first tank port and a second tank port; and
    the manifold defining a motor lube port fluidly connected to the second tank port.

5. The valve assembly of claim 1 wherein the pressure transfer valve includes a valve member with a first hydraulic pressure surface and an opposing second hydraulic pressure surface, and including a spring operably positioned to bias the valve member toward the first configuration.

6. The valve assembly of claim 5 wherein the first hydraulic surface is exposed to fluid pressure in the line sensing port; and
    the second hydraulic surface is exposed to fluid pressure in at least one of the first motor port and the second motor port.

7. The valve assembly of claim 6 wherein the spring has a preload that causes the valve member to move toward the second configuration when a second pressure on the second hydraulic surface is at least a predetermined pressure differential greater than a first pressure on the first hydraulic surface.

8. The valve assembly of claim 7 wherein the load control valve is housed in a first cartridge attached to the manifold;
    the flow direction control valve includes a pressure switch valve and the second electrical actuator housed in a second cartridge attached to the manifold, and a pressure actuated flow direction valve housed in a third cartridge attached to the manifold;
    the tank connection valve includes a first check valve and a second check valve housed in a fourth cartridge attached to the manifold; and
    the pressure transfer valve is housed in a fifth cartridge attached to the manifold;
    a pump protection valve housed in a sixth cartridge attached to the manifold;
    the at least one tank port includes a first tank port and a second tank port; and
    the manifold defining a motor lube port fluidly connected to the second tank port.

9. A machine comprising:
    a hydraulic fan system that includes a tank, a pump, a fan rotatably coupled to a hydraulic motor, and a pressure transfer passage extending between a first motor passage and a second motor passage;

the hydraulic fan system including a pressure transfer valve positioned in the pressure transfer passage and having a first configuration at which the first motor passage is fluidly blocked from the second motor passage, and a second configuration at which the first motor passage is fluidly connected to the second motor passage;

said hydraulic motor rotating in a first direction responsive to fluid flow from the first motor passage, through the hydraulic motor to the second motor passage, and said hydraulic motor rotating in a second direction responsive to fluid flow from the second motor passage, through the hydraulic motor to the first motor passage;

the hydraulic fan system including a flow direction control valve having a first configuration at which the first motor passage is fluidly connected to an outlet of the pump, and a second configuration at which the second motor passage is fluidly connected to the outlet of the pump; and wherein the pressure transfer valve moves from the first configuration toward the second configuration when a pressure differential between a line sensing passage and one of the first and second motor passages exceeds a predetermined pressure differential.

10. The machine of claim 9 wherein the pressure transfer valve includes a spring operably positioned to bias a valve member toward the first configuration; and the valve member includes a first hydraulic pressure surface and an opposing second hydraulic pressure surface.

11. The machine of claim 10 wherein the spring has a preload that causes the valve member to move toward the second configuration when a second pressure on the second hydraulic surface is at least a predetermined pressure differential greater than a first pressure on the first hydraulic surface.

12. The machine of claim 11 wherein the pressure transfer valve is one of a plurality of cartridge valves attached to a manifold that includes a first pump port, a second pump port, at least one tank port and a pump port.

13. The machine of claim 11 wherein the first hydraulic surface is exposed to fluid pressure in the line sensing passage; and the second hydraulic surface is exposed to fluid pressure in at least one of the first motor passage and the second motor passage.

14. The machine of claim 9 wherein the hydraulic fan system includes a fan load control electrical actuator and a rotation direction control electrical actuator in control communication with an electronic controller.

15. The machine of claim 9 including a pump protection valve fluidly positioned between the pump outlet and a flow direction valve.

16. A method of reversing a fan rotation direction, comprising the steps of:

switching a pump output fluid connection from a first motor passage to a second motor passage;

opening a pressure transfer passage responsive to a pressure differential between a line sensing port and one of the first and second motor passages exceeding a predetermined pressure differential;

channeling fluid flow in the pressure transfer passage from the second motor passage to the first motor passage while the fan is decelerating toward a zero speed;

closing the pressure transfer passage; and rotating the fan in a reverse direction by channeling fluid flow from the pump output, into the second motor passage, through a motor coupled to the fan, to the first motor passage after the closing step.

17. The method of claim 16 wherein the step of channeling fluid flow in the pressure transfer passage includes moving a valve member of pressure transfer valve responsive to a pressure differential acting on a first pressure surface and an opposing second pressure surface of the valve member.

18. The method of claim 17 including biasing the valve member with a spring toward a position that closes the pressure transfer passage.

19. The method of claim 18 including changing a control signal to a fan load control electrical actuator;

energizing a rotation direction control electrical actuator to accomplish the switching step; and re-changing the control signal to the fan load control electrical actuator after the energizing step.

20. The method of claim 19 including a step of closing a pump protection valve while the fan is decelerating toward the zero speed.

* * * * *